United States Patent [19]
Föhl

[11] Patent Number: 5,480,190
[45] Date of Patent: Jan. 2, 1996

[54] ENERGY CONVERTER IN A RESTRAINING SYSTEM FOR VEHICLE OCCUPANTS

[75] Inventor: Artur Föhl, Schorndorf, Germany

[73] Assignee: TRW Repa GmbH, Alfdorf, Germany

[21] Appl. No.: 222,176

[22] Filed: Apr. 4, 1994

Related U.S. Application Data

[63] Continuation of Ser. No. 19,057, Feb. 18, 1993, abandoned.

[30] Foreign Application Priority Data

Feb. 27, 1992 [DE] Germany .................... 42 06 117.2

[51] Int. Cl.⁶ .................................................. B60R 22/46
[52] U.S. Cl. ...................... 280/806; 60/635; 60/638; 188/374; 297/480
[58] Field of Search ........................... 280/806; 297/480; 188/371, 374, 377; 60/632, 635, 638

[56] References Cited

U.S. PATENT DOCUMENTS

| 3,026,972 | 3/1962 | Hendry et al. |  |
|---|---|---|---|
| 3,538,785 | 11/1970 | Grancon | 188/371 |
| 3,583,530 | 6/1971 | De Venne | 188/268 |
| 3,757,900 | 9/1973 | Gischlar | 188/374 |
| 4,237,690 | 12/1980 | Tsuge et al. | 280/806 |
| 4,258,934 | 3/1981 | Tsuge et al. | 188/371 |
| 4,423,846 | 1/1984 | Fohl | 280/806 |
| 5,129,679 | 7/1992 | Specht et al. | 280/806 |

FOREIGN PATENT DOCUMENTS

| 422410 | 9/1990 | European Pat. Off. |  |
|---|---|---|---|
| 0398010 | 11/1990 | European Pat. Off. |  |
| 2436754 | 3/1975 | Germany . |  |
| 2349891 | 4/1975 | Germany . |  |
| 2364235 | 6/1975 | Germany . |  |
| 2811694 | 9/1979 | Germany | 280/806 |
| 2946717 | 6/1980 | Germany . |  |
| 3900024 | 7/1990 | Germany | 280/806 |

OTHER PUBLICATIONS

European Search Report EP 93 10 2403.

*Primary Examiner*—Eric D. Culbreth
*Attorney, Agent, or Firm*—Tarolli, Sundheim & Covell

[57] ABSTRACT

In an energy converter in a restraining system for vehicle occupants a particularly smooth profile of the force as a function of the travel is achieved in that only a few deformation members are provided which effect a plastic deformation of a tubular converter body (10). A plate (30) is pivotal between a rest position inclined to the axis of the converter body (10) and an erected operating position in which it brings the deformation members (30a) formed at its radially outer ends into engagement with the inner side of the converter body (10).

9 Claims, 2 Drawing Sheets

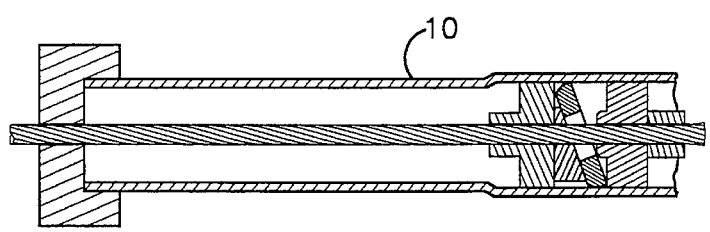
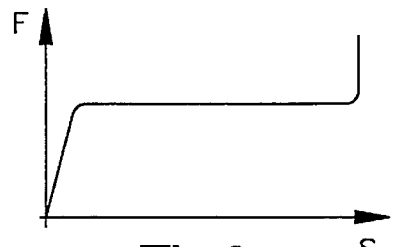
Fig. 5a
Fig. 6a
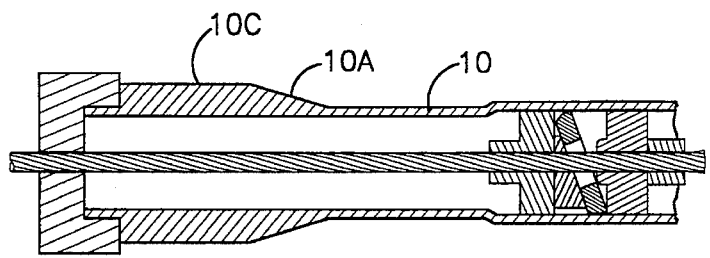
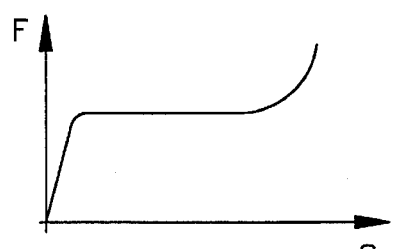
Fig. 5b
Fig. 6b
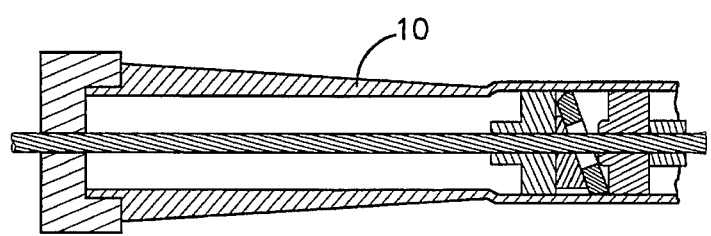
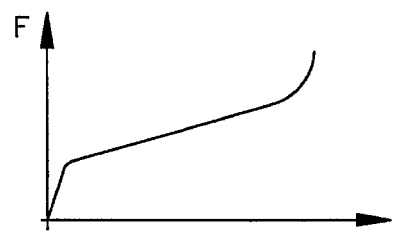
Fig. 5c
Fig. 6c

ENERGY CONVERTER IN A RESTRAINING SYSTEM FOR VEHICLE OCCUPANTS

This is a continuation of application Ser. No. 08/019,057 filed on Feb. 18, 1993 now abandoned.

The present invention relates to an energy converter in a restraining system for vehicle occupants, comprising a tubular converter body of plastically deformable material and a deforming means which is accommodated therein and to which a pulling or thrust means is connected.

The purpose of such an energy transformer or converter is to diminish load peaks in a safety belt system which occur during the forward displacement of a vehicle occupant in a vehicle collision. The use of such an energy converter is particularly effective in combination with a belt pretensioner which eliminates the belt slack before the forward displacement of the vehicle occupant begins. An adequate movement travel is then available for the forward displacement of the vehicle occupant and the simultaneously occurring energy conversion.

Such an energy converter, which is also referred to as a force limiter, is described in EP 0 422 410 A1. It consists of a cylinder of plastically deformable material in which a rod is received which projects at its one end out of the cylinder and its other end defines a free space in which a plurality of roller bodies are accommodated. The outer diameter of the ring arrangement formed by the roller bodies is greater that the inner diameter of the cylinder bore. Under a high tensile load between the cylinder and the rod the roller bodies penetrate into the material of the cylinder wall, performing deformation work with formation of longitudinal grooves; due to this work a high amount of energy is transformed and load peaks in the belt system are diminished.

The limitation of the load peaks occurring in the belt system which can be achieved with such an energy converter makes a substantial contribution to the reduction of the risk of injury, as can be proved with the aid of load measurements on so-called dummies. It has however been found that although the load peaks in the belt system can be limited by such an energy converter, they cannot be avoided.

The present invention provides an improved an energy converter, wherein any load peaks in the belt system are further reduced and almost eliminated, so that an almost constant load, or one which rises gradually in desired manner, occurs in the belt system.

According to the invention, the deforming means comprises a plate which is pivotal between a rest position inclined to the axis of the converter body and an erected operating position in which it brings the deformation members formed at its radially outer ends into engagement with the inner side of the converter body. The energy converter, according to the invention is distinguished by constructional simplicity and low manufacturing costs. Furthermore, it is designed particularly for a force limitation to a level within a range of about 5,000 to 12,000 N. Forces in this range occur at the belt buckle; since at the buckle forces are introduced via two webbing portions, that is the shoulder belt and waist belt, the force level there is twice as high as, for example, in the webbing portion between the deflection fitting and belt retractor. The energy converter according to the present invention is therefore intended in particular for use in the region between the buckle and its anchoring to the vehicle.

The invention is based on the recognition that to avoid load peaks in the belt system it must be ensured that the energy transformation by plastic deformation of the material of the converter body takes place smoothly without jerks. To achieve this, it is favourable for the deformation members to penetrate into the material of the converter body appreciably deeper than the roller bodies of the known energy converter. This then avoids the wall of the converter body initially yielding elastically and then being approximately polygonally deformed before the deformation members penetrate into the material of the wall of the converter body. It has been found that abrupt fluctuations of the travel-dependent force profile can be substantially avoided if a predominantly plastic deformation of the wall of the tubular converter body occurs and elastic deformations are extensively suppressed.

Various further developments and embodiments are set forth in the subsidiary claims.

Further features and advantages of the invention will be apparent from the following description of several embodiments and from the drawings, to which reference is made and in which:

FIG. 5a to 5c show three embodiments of the energy converter with different configuration of the tubular converter body; and FIG. 6a to 6c show diagrams which illustrate the profile of the force as a function of the travel for the embodiments according to FIGS. 5a to 5c.

Figure 4A:
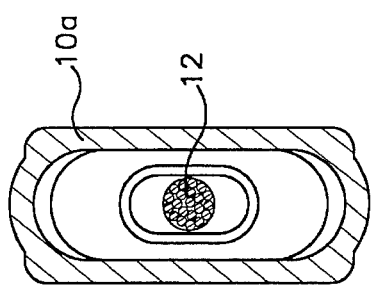
FIG. 4a shows a variant of the embodiment according to FIGS. 1 to 4 in which a converter body of rectangular cross-section is employed.

In a tubular converter body 10 of circular cross-section a deforming means is arranged on a pulling cable 12 and comprises two piston elements 14, 16 arranged with distance from each other on the pulling cable 12, a plate 30 and a wedge-shaped guide member 34. The piston elements 14, 16 are displaceable in the tubular converter body 10. Piston element 16 is fixed on cable 12, and piston element 14 is slidingly mounted on cable 12. The plate 30 has a central cutout 32 for the passage of the pulling cable 12 but also to receive a cylindrical centering nose 16a on the opposite end face of the piston element 16. The plate is held by the wedge-shaped guide member 34 of resilient material in the rest position inclined to the axis of the tubular converter body 10 at an angle α of about 30° and at its two symmetrically oppositely disposed ends comes into contact with the inner side of the wall of the converter body 10. As can be seen from the FIGS. 2 and 4, the plate 30 comprises at these symmetrically oppositely disposed ends in each case two adjacent projections 30a which are provided with a chamfer 36 on their side facing the piston element 14. The projections 30a form deformation members, the chamber 36 ensuring a gentle penetration into the material of the wall of the converter body 10 without chip formation or cutting effect.

Figure 2:
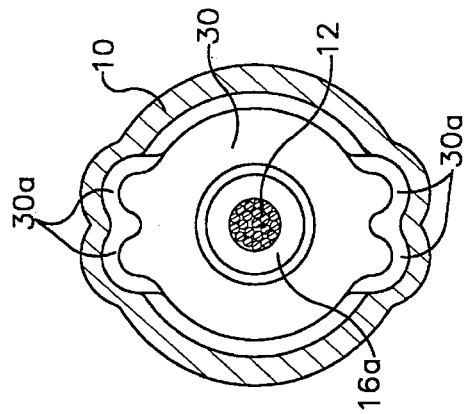
FIG. 2 shows a cross-section of the energy converter shown in FIG. 1 after plastic deformation of the tubular converter body has occurred.
Figure 1:
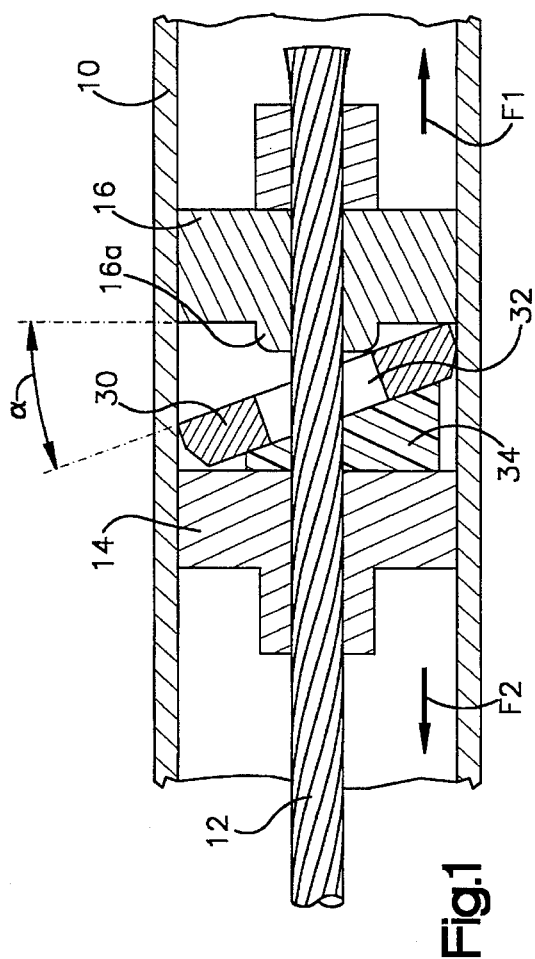
FIG. 1 shows a schematic partial longitudinal section of the energy converter according to an embodiment of the invention.
Figure 3:
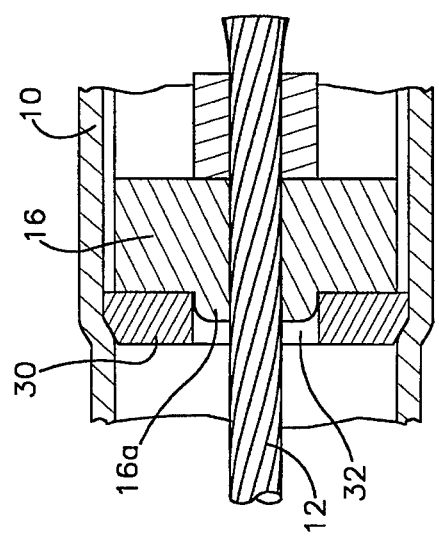
FIG. 3 shows a schematic partial longitudinal section of the energy converter shown in FIGS. 1 and 2 after plastic deformation of the tubular converter body has occurred.

In a safety belt system the tubular converter body 10 is anchored for example to the vehicle and the belt buckle is connected to the pulling cable 12. The piston/cylinder means shown in FIG. 1 may form at the same time the linear drive of a belt tightener engaging the buckle. In such a construction the piston element 16 is subjected in the cylinder formed by the tubular converter body 10 to the pressure of the gases generated by a pyrotechnical gas generator, so that the piston elements 14, 16 are displaced in FIG. 1 in the direction of an Arrow F1 in the interior of the tubular converter body 10, the pulling cable 12 and consequently the buckle connected thereto being entrained. On movement of the piston elements 14, 16 in the direction of an arrow F1 in FIG. 1, the plate 30 remains in its inclined rest position. After belt tightening has been effected the forward displacement of the vehicle occupant secured by the belt system begins, a tension being exerted via the pulling cable 12 in the direction of the arrow F2 in FIG. 1 on the piston elements 14, 16. The inner side of the wall of the converter body 10 has a surface which is engaged by the projections 30 *a* on the plate 30 to support the plate 30 for pivotal movement from its inclined rest position to an erected position. The plate 30, which is held with its projections 30*a* resiliently in engagement with the inner side of the wall of the converter body 10, is erected and penetrates with said projections 30*a* into the material of the wall of the converter body 10. FIGS. 2 and 3 show the state after deformation of the converter body 10 has occurred.

FIGS. 2 and 3 show the state of the energy converter after effected deformation of the tubular converter body 10 which has a circular cross-section.

Figure 4:
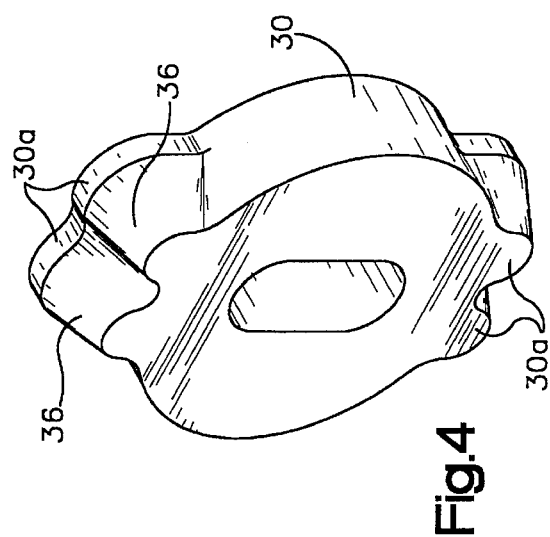
FIG. 4 shows a perspective view of a deforming means constructed as plate in the embodiment according to FIGS. 1 to 3.

A particularly flat design can be achieved with the embodiment shown in FIG. 4*a*. In the latter the converter body 10*a* in the undeformed state has a rectangular cross-sectional form and after deformation is approximately oval.

If the wall thickness of the tubular converter body 10 is constant as illustrated in FIG. 5*g*, the profile of the force F shown in the diagram of FIG. 6*a* as a function of the travel S results. The force F is the force which must be exerted in the displacement of the piston elements 14, 16 with the plate 30 in the tubular converter body 10 and the travel distance S is that of the displacement of said piston elements 14, 16, with the plate 30 in the interior of the converter body 10. As apparent from FIG. 6*a*, the force F starts from zero and increases smoothly up to a maximum value which is reached after only a fraction of the total travel available. It should be particularly noted that the profile of the force F is largely free from peaks and troughs. It is here that the energy converter according to the invention differs very considerably from the prior art comprising a plurality of individual deformation members, for example balls, which penetrate only slightly into the material of the converter body. In the embodiment shown in FIG. 5*a* and having a constant wall thickness of the converter body 10, the force F thereafter remains almost constant until the end stop of the converter body 10 is reached.

In the embodiment shown in FIG. 5*b* the wall thickness of the converter body 10 is constant over about half its length and then increases in a portion 10*a* gradually to about twice the value, thereafter remaining constant in a portion 10*c*. FIG. 6*b* shows the associated profile of the force F as a function of the travel S. In contrast to FIG. 6*a*, the force F increases after passing through about half the travel S and reaches its maximum value just before the end of the converter body.

In the embodiment according to FIG. 5*c* the wall thickness of the converter body 10 increases gradually from the start thereof to the end thereof. FIG. 6*c* shows the associated profile of the force F as a function of the travel S. As can be seen, the force F increases initially relatively steeply and then progressively, gradually assuming a maximum value in the region of the stop at the end of the converter body 10.

By suitable dimensioning of the wall thickness of the converter body 10 over the length thereof, almost any desired profile, suitable for a specific use of the force F as a function of the travel S can be achieved. In all projections it can be seen that the force profile is completely free of pronounced peaks or troughs, thereby very considerably diminishing the risk of injury.

I claim:

1. An energy converter for use in a vehicle occupant restraint system, said energy converter comprising:

a tubular converter body including a yieldable wall comprising plastically deformable material, said tubular converter body having an axis;

a piston slidingly disposed in said tubular converter body;

a plate including a circular portion;

a cable connected to said piston and said plate;

means for supporting said plate for pivotal movement between a rest position inclined to the axis of said converter body and an erected engagement position;

said plate being arranged in said rest position between said piston and another piston axially spaced apart from said piston, one of said pistons being slidingly mounted on said cable, said plate having a central cutout into which a centering projection on an adjacent end face of said piston fixed on said cable can engage in fitting manner;

means disposed on said plate for plastically deforming said yieldable wall of said converter body when forces in a range from about 5,000N to about 12,000N are transmitted to said piston and said plate by said cable and said plate is moved through said converter body in a predetermined direction along the axis of said converter body, said means comprising at least one pair of radially opposite engagement projections projecting from said circular portion of said plate and engaging said wall of said converter body when said plate is in its erected engagement position; and said plate being held by an elastically deformable guide member in said rest position in which its plane is disposed inclined to the axis of said converter body and said projections are in contact with said wall of said converter body.

2. An energy converter according to claim 1 further comprising an elastically deformable guide member located between said pistons in said converter body for positioning said plate in said rest position in which its plane is disposed inclined to the axis of said converter body and said engagement projections are in contact with said wall of said converter body.

3. An energy converter according to claim 1 wherein said converter body is formed by a cylinder of a pyrotechnical piston/cylinder linear drive of a belt pretensioner and said piston is a piston of said linear drive, said plate being arranged on said piston of said linear drive, said piston moving in a direction opposite to said predetermined direction upon activation of said linear drive.

4. An energy converter according to claim 1 wherein said yieldable wall has a variable wall thickness between axial end portions of said converter body to provide a variable resistance to deformation of the material of said inner wall upon axial movement of said plate from one axial end portion to an other axial end portion.

5. An energy converter according to claim 1 wherein said converter body has a rectangular cross section.

6. An energy converter according to claim 1 wherein said converter body has a circular cross section.

7. An energy converter according to claim 1 further comprising a second pair of radially opposite engagement projections which project from said circular portion of said plate and which engage with and penetrate into the material of the wall to deform the material of the wall along the axis of said converter body as said plate moves through said converter body in the predetermined direction.

8. An energy converter according to claim 7 wherein each engagement projection of said first and second pairs of radially opposite engagement projections includes an outer radial end portion which is rounded.

9. An energy converter according to claim 7 wherein each engagement projection of said first and second pairs of radially opposite engagement projections includes a chamfer at an edge which engages and penetrates into the material of said inner wall of said converter body.

* * * * *